US011954299B2

(12) United States Patent
Kajihara

(10) Patent No.: US 11,954,299 B2
(45) Date of Patent: Apr. 9, 2024

(54) DYNAMIC-STATE RECORDING OF CONTENTS OF A REPORT AT A DISASTER SITE

(71) Applicant: NEC Corporation, Tokyo (JP)

(72) Inventor: Honoka Kajihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/787,666

(22) PCT Filed: Dec. 27, 2019

(86) PCT No.: PCT/JP2019/051536
§ 371 (c)(1),
(2) Date: Jun. 21, 2022

(87) PCT Pub. No.: WO2021/131047
PCT Pub. Date: Jul. 1, 2021

(65) Prior Publication Data
US 2022/0413680 A1    Dec. 29, 2022

(51) Int. Cl.
*G06F 3/04812* (2022.01)
*G06F 3/0484* (2022.01)

(52) U.S. Cl.
CPC ........ *G06F 3/04812* (2013.01); *G06F 3/0484* (2013.01)

(58) Field of Classification Search
None
See application file for complete search history.

(56) References Cited

U.S. PATENT DOCUMENTS

| 2005/0196733 A1* | 9/2005 | Budra | G09B 7/00 434/178 |
| 2007/0083396 A1* | 4/2007 | Kanada | G16H 30/20 382/128 |
| 2009/0169060 A1* | 7/2009 | Faenger | G09B 29/007 382/113 |
| 2019/0236525 A1* | 8/2019 | Stanley | G06N 3/08 |

FOREIGN PATENT DOCUMENTS

| JP | 2013-134663 A | 7/2013 |
| JP | 2016-057842 A | 4/2016 |
| JP | 2016057842 A * | 4/2016 |
| JP | 2016-167120 A | 9/2016 |
| JP | 2017-162393 A | 9/2017 |
| JP | 2019-016289 A | 1/2019 |

OTHER PUBLICATIONS

International Search Report for PCT Application No. PCT/JP2019/051536, dated Mar. 17, 2020.

* cited by examiner

*Primary Examiner* — Mandrita Brahmachari
(74) *Attorney, Agent, or Firm* — Sughrue Mion, PLLC

(57) ABSTRACT

A dynamic-state recording apparatus according to the present disclosure includes an input device configured to be operated by a user; a display; display control means for displaying, on the display, a dynamic-state recording screen containing a plurality of report items required to be reported at a disaster site; and first storage means in which, each time the user selects a next report item to be reported among the plurality of report items through the input device, the selected report item and a report date and time of the selected report item are accumulated in a state in which the report item and the report date and time are associated with each other.

14 Claims, 12 Drawing Sheets

DYNAMIC-STATE RECORDING OF CONTENTS OF A REPORT AT A DISASTER SITE

This application is a National Stage Entry of PCT/JP2019/051536 filed on Dec. 27, 2019, the contents of all of which are incorporated herein by reference, in their entirety.

TECHNICAL FIELD

The present disclosure relates to a dynamic-state recording apparatus, a dynamic-state recording system, a dynamic-state recording method, and a computer readable recording medium.

BACKGROUND ART

For example, Patent Literature 1 discloses a system that records (stores), in a database, on-site information collected from each of mobile units dispatched to a disaster site and time at which the on-site information was recorded while associating them with each other. The on-site information is, for example, information about damage to infrastructure facilities, fire information, flooding information, land-subsidence information, liquefaction information, weather information (such as precipitation and/or a wind direction/speed), river-flooding information, and radioactive contamination information.

CITATION LIST

Patent Literature

Patent Literature 1: Japanese Unexamined Patent Application Publication No. 2013-134663

SUMMARY OF INVENTION

Technical Problem

However, in the system disclosed in Patent Literature 1, although it is possible to record the on-site information collected from each of mobile units and the time at which the on-site information was recorded while associating them with each other, nothing is proposed in regard to recording (storing) contents of a report required at a disaster site (e.g., a disaster site where firefighters work) and the time of the report while associating them with each other through a simple operation.

In view of the above-described problem, an object of the present disclosure is to provide a dynamic-state recording apparatus capable of recording contents of a report required at a disaster site (e.g., a disaster site where firefighters work) and a date and time of the report while associating them with each other through a simple operation.

Solution to Problem

A dynamic-state recording apparatus according to a first aspect of the present disclosure includes: an input device configured to be operated by a user; a display; display control means for displaying, on the display, a dynamic-state recording screen containing a plurality of report items required to be reported at a disaster site; and first storage means in which, each time the user selects a next report item to be reported among the plurality of report items through the input device, the selected report item and a report date and time of the selected report item are accumulated in a state in which the report item and the report date and time are associated with each other.

A dynamic-state recording apparatus according to a second aspect of the present disclosure includes: an input device configured to be operated by a user; a display; display control means for displaying, on the display, a displayed-content change screen in which the user can change a displayed content through the input device; and second storage means in which, each time a predetermined time elapses, the displayed content of the displayed-content change screen displayed on the display at that time point is accumulated, in which the display control means displays a difference information screen containing difference information on the display in response to an operation performed on the input device by the user, the difference information that is a difference between a first displayed content of the displayed-content change screen, accumulated in the second storage means and a second displayed content of the displayed-content change screen, accumulated in the second storage means immediately before the first displayed content.

A dynamic-state recording system according to a third aspect of the present disclosure includes: a dynamic-state recording apparatus installed at a disaster site; and an external apparatus installed at a place remote from the disaster site, in which the dynamic-state recording apparatus includes: an input device configured to be operated by a user; a display; display control means for displaying, on the display, a dynamic-state recording screen containing a plurality of report items required to be reported at a disaster site; first storage means in which, each time the user selects a next report item to be reported among the plurality of report items through the input device, the selected report item and a report date and time of the selected report item are accumulated in a state in which the report item and the report date and time are associated with each other; and communication means for transmitting the selected report item and the report date and time of the selected report item to the external apparatus while associating the report item and the report date and time with each other, and the external apparatus includes a storage device in which the selected report item and the report date and time of the selected report item, transmitted from the communication means are accumulated in a state in which the report item and the report date and time are associated with each other.

A dynamic-state recording method according to a fourth aspect of the present disclosure includes: a step of displaying, on a display, a dynamic-state recording screen containing a plurality of report items required to be reported at a disaster site; a step of making a user select a next report item to be reported from among the plurality of report items through an input device; and a step of accumulating, each time the report item is selected, the selected report item and a report date and time of the selected report item in first storage means.

A computer readable recording medium according to a fifth aspect of the present disclosure stores a program for causing an electronic device including an input device configured to be operated by a user, a display, and at least one processor to perform: a process of displaying, on the display, a dynamic-state recording screen containing a plurality of report items required to be reported at a disaster site; a process of making a user select a next report item to be reported from among the plurality of report items through the input device; and a process of accumulating, each time the report item is selected, the selected report item and a report date and time of the selected report item in first storage means.

Advantageous Effects of Invention

According to the present invention, it is possible to provide a dynamic-state recording apparatus, a dynamic-state recording system, a dynamic-state recording method, and a computer readable recording medium capable of recording contents of a report required at a disaster site (e.g., a disaster site where firefighters work) and a date and time of the report while associating them with each other through a simple operation.

DESCRIPTION OF EMBODIMENTS

First Example Embodiment

Figure 1:
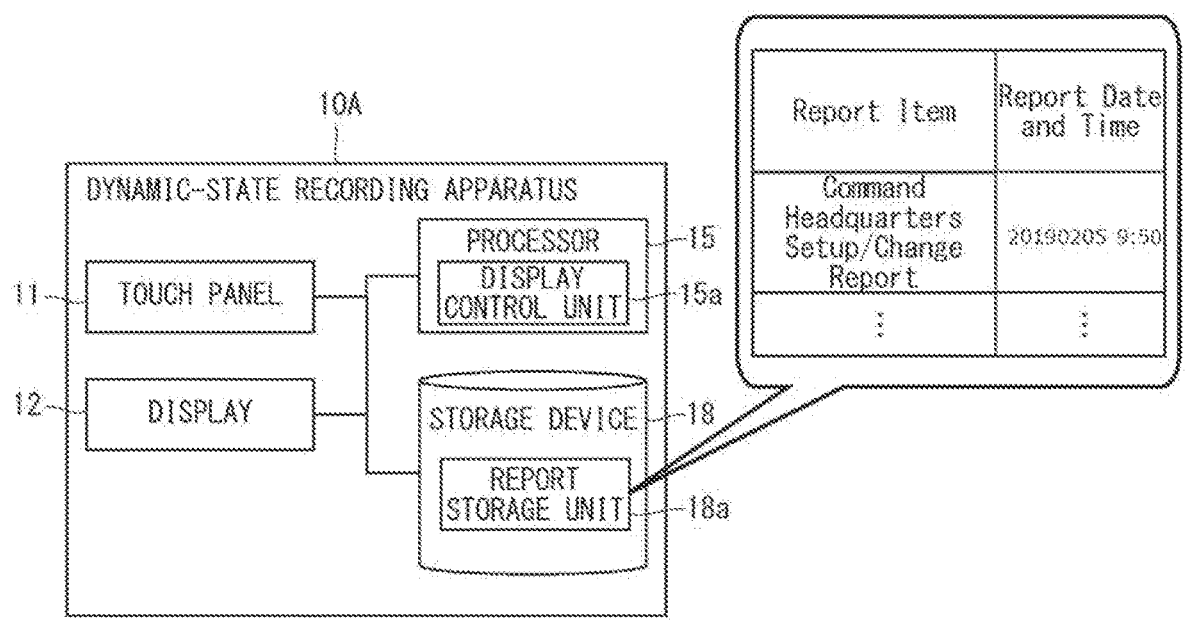
FIG. 1 is a system configuration diagram of a dynamic-state recording apparatus 10A according to a first example embodiment.

A dynamic-state recording apparatus 10A according to a first example embodiment of the present invention will be described hereinafter with reference to the attached drawings. The same reference numerals (symbols) are assigned to corresponding components throughout the drawings, and redundant descriptions thereof are omitted.

Firstly, a configuration of the dynamic-state recording apparatus 10A according to the first example embodiment will be described with reference to FIG. 1.

FIG. 1 is a system configuration diagram of the dynamic-state recording apparatus 10A according to the first example embodiment.

The dynamic-state recording apparatus 10A according to the first example embodiment is an electronic device installed at a disaster site (e.g., a site of a fire) where firefighters work. As shown in FIG. 1, the dynamic-state recording apparatus 10A includes a touch panel 11, a display 12, a processor 15, and a storage device 18.

The touch panel 11 is an input device that a user operates, and is disposed so as to cover the display surface of the display 12. The touch panel 11 is an example of the input device according to the present invention. The display 12 is, for example, a display equipped with the touch panel 11. A display equipped with a touch panel is also called a touch screen display. The display 12 is, for example, a large display (e.g., a 42-inch display) and is an electronic paper on which displayed contents can be electrically rewritten.

The processor 15 is, for example, a CPU (Central Processing Unit), and functions as a display control unit 15a by executing a certain program loaded from a ROM (not shown) or the storage device 18 into a RAM (not shown). Only one processor 15 may be used, or a plurality of processors may be used.

The display control unit 15a displays, on the display 12, a dynamic-state recording screen G1 (a dynamic-state recording window G1) containing a plurality of report items required to be reported at a disaster site where firefighters work in response to an operation performed on the touch panel 11 by a user. The display control unit 15a is an example of the display control means according to the present invention.

Figure 2:
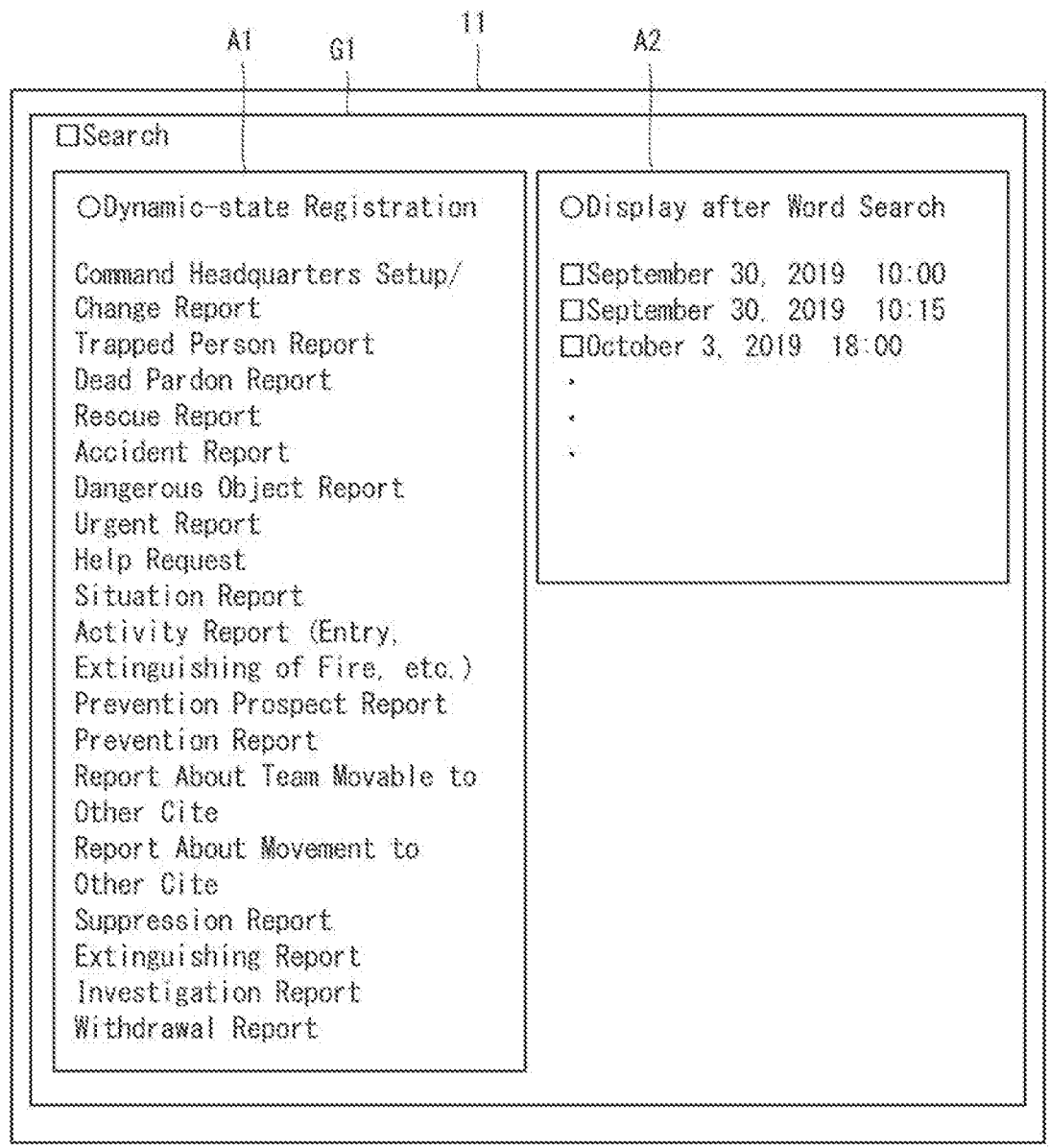
FIG. 2 shows an example of a dynamic-state recording screen G1 displayed on a display 12.

FIG. 2 shows an example of the dynamic-state recording screen G1 displayed on the display 12. The dynamic-state recording screen G1 is used to record a dynamic state (report items) together with a date and time (a report date and time) thereof.

As shown in FIG. 2, the dynamic-state recording screen G1 includes a report item display area A1 and a search result display area A2.

The report item display area A1 contains a plurality of report items that are required to be reported at a disaster site where firefighters work. The plurality of report items are displayed in the order according to which they should be reported. For example, the uppermost item "Command Headquarters Setup/Change Report" is the first report item required to be reported. A "Escape Fail Report (Trapped Person Report)" displayed immediately below it is the next item required to be reported. A "Dead Person Report" displayed immediately below it is the next item required to be reported. The same applies to a "Rescue Report" and so on displayed below it. Note that the plurality of report items can be customized, for example, by displaying a setting screen (a setting window) (not shown) on the display 12. For example, the plurality of report items can be customized by omitting (eliminating) some of the report items, adding other report items, and/or changing the order according to which the report items are displayed.

The user selects (taps) the next report item to be reported in the dynamic-state recording screen G1 (i.e., from among the plurality of report items) through the touch panel 11.

The storage device 18 is, for example, a nonvolatile mass storage device such as HDD (Hard Disk Drive) and an SSD (Solid State Drive). The storage device 18 includes a report storage unit 18a. The report storage unit 18a is an example of the first storage means according to the present invention.

In the report storage unit 18a, "report items" and "report dates and times" are stored (accumulated) in a state in which the report item and the report date and time are associated with each other (see FIG. 1). These data are stored, for example, in the form of a table or a database.

In the "Report Item", a report item (or identification information for identifying the report item) that the user has selected in the dynamic-state recording screen G1 (i.e., from among the plurality of report items) through the touch panel 11 is stored. For example, when the user selects a report item "Command Headquarters Setup/Change Report" in the dynamic-state recording screen G1 (i.e., from among the plurality of report items) through the touch panel 11, the selected report item "Command Headquarters Setup/Change Report" is stored.

In the "Report Date and Time", the report date and time of the report item stored in the "Report Item" is stored. For example, when the user selects the report item "Command Headquarters Setup/Change Report" in the dynamic-state recording screen G1 (i.e., from among the plurality of report items) through the touch panel 11, a date and time at which the report item "Command Headquarters Setup/Change Report" was selected (e.g., 20190205 9:50) is stored.

Next, as an example of operations performed by the dynamic-state recording apparatus 10A having the above-described configuration, a dynamic-state recording process will be described.

Figure 3:
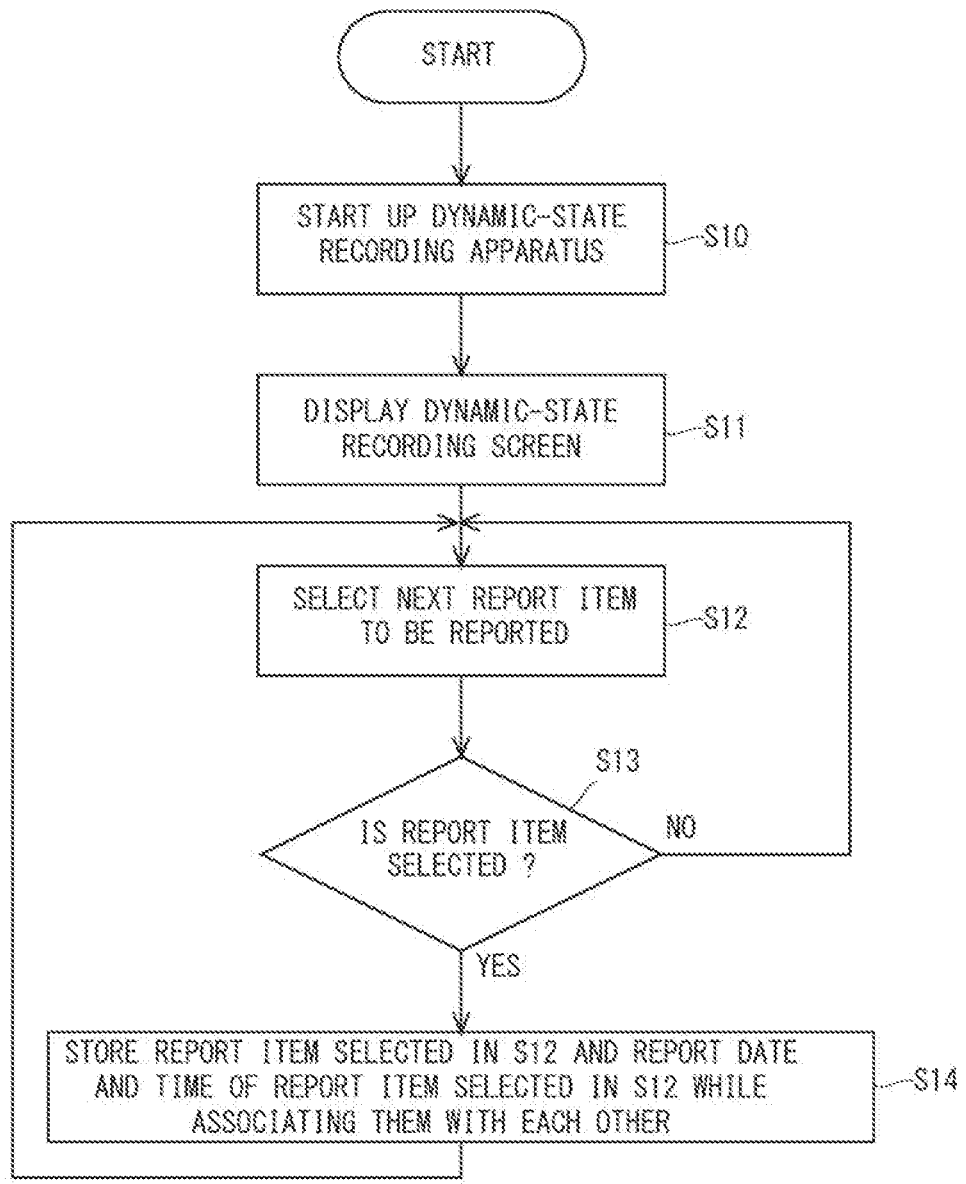
FIG. 3 is a flowchart of a dynamic-state recording process.

FIG. 3 is a flowchart of the dynamic-state recording process.

The following process is carried out by having the processor 15 execute a certain program loaded from an ROM (not shown) or the storage device 18 into an RAM (not shown).

Firstly, the dynamic-state recording apparatus 10A is started up (Step S10).

Next, the dynamic-state recording apparatus 10A (the display control unit 15a) displays the dynamic-state recording screen G1 (see FIG. 2) on the display 12 in response to an operation performed on the touch panel 11 by a user (Step S11).

Next, the user selects (taps) the next report item to be reported in the dynamic-state recording screen G1 (i.e., from among the plurality of report items) through the touch panel 11 (Step S12). In this example, it is assumed that a "Command Headquarters Setup/Change Report" is selected as the next report item to be reported (Step S13: Yes).

Next, the dynamic-state recording apparatus 10A (e.g., the processor 15) stores the report item selected in the step S12 and the report date and time of the report item selected in the step S12 in the report storage unit 18a while associating the report item and the report date and time with each other (Step S14).

Specifically, the dynamic-state recording apparatus 10A stores the report item selected in the step S12 (in this example, the "Command Headquarters Setup/Change Report") in the "Report Item" of the report storage unit 18a, and stores the report date and time (e.g., 20190205 9:50) of the report item "Command Headquarters Setup/Change Report" selected in the step S12 in the "Report Date and Time" of the report storage unit 18a (see FIG. 1).

After that, whenever the user selects the next report item to be reported in the dynamic-state recording screen G1 (i.e., from among the plurality of report items) through the touch panel 11 (Step S12, Step S13: Yes), the above-described process in the step S14 is repeatedly performed. As a result, report items selected by the user in the step S12 and report dates and times of the report items selected in the step S12 are successively stored (accumulated) in the storage device 18 (the report storage unit 18a) in a state in which the report items and the report dates and times are associated with each other.

A series of information (report item and report date/time of the report item) stored (accumulated) in a time series in this way can be used, for example, for retrospectives (a review of when and what actions were taken at the disaster site and their appropriateness) after being withdrawn from the disaster site. For example, by displaying a series of information stored in the time series on a display or printing and distributing the series of information stored in the time series, a plurality of persons can share and look back on the series of information stored in the time series. This makes it possible to improve actions at disaster sites in the future.

As described above, according to the first example embodiment, each time a user selects (taps) the next report item to be reported in the dynamic-state recording screen G1 (i.e., from among the plurality of report items) through the touch panel 11, the selected report item and the report date and time of the selected report item are automatically accumulated in a state in which the report item and the report date and time are associated with each other. That is, according to the first example embodiment, it is possible to record contents of a report required at a disaster site (e.g., a disaster site where firefighters work) and a date and time of the report while associating them with each other through a simple operation.

Second Example Embodiment

A dynamic-state recording system 1 according to a second example embodiment of the present invention will be described hereinafter with reference to the attached drawings. The same reference numerals (symbols) are assigned to corresponding components throughout the drawings, and redundant descriptions thereof are omitted. In the following description, the same reference numerals (symbols) as those in the first example embodiment are assigned to components/structures similar to those in the first example embodiment, and redundant descriptions thereof are omitted.

A configuration of the dynamic-state recording system 1 according to the second example embodiment will be described with reference to FIG. 4.

Figure 4:
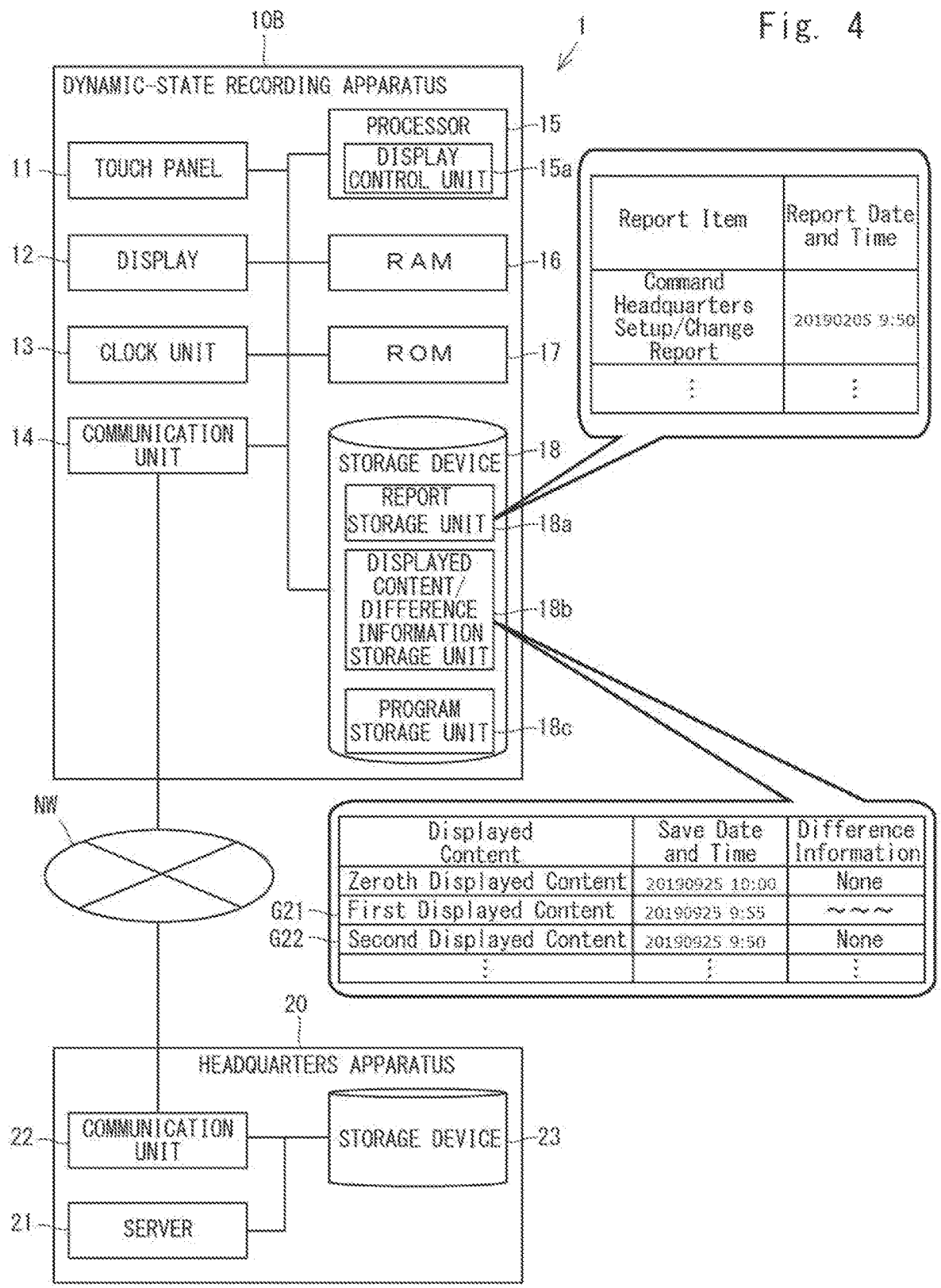
FIG. 4 is a system configuration diagram of a dynamic-state recording system 1 according to a second example embodiment.

FIG. 4 is a system configuration diagram of the dynamic-state recording system 1 according to the second example embodiment.

As shown in FIG. 4, the dynamic-state recording system 1 according to the second example embodiment includes a dynamic-state recording apparatus 10B and a headquarters apparatus 20.

Firstly, a configuration of the dynamic-state recording apparatus 10B will be described.

The dynamic-state recording apparatus 10B according to the second example embodiment is an electronic device installed at a disaster site (e.g., a site of a fire) where firefighters work. As shown in FIG. 4, the dynamic-state recording apparatus 10B includes a touch panel 11, a display 12, a clock unit 13, a communication unit 14, a processor 15, a RAM (Random Access Memory) 16, a ROM (Read Only Memory) 17, and a storage device 18.

The touch panel 11 and the display 12 have already been described in the first example embodiment, so their descriptions are omitted.

The clock unit 13 outputs a date and time. The communication unit 14 is a communication apparatus that communicates with the headquarters apparatus 20 through a communication line NW (e.g., the Internet), and is, for example, a NIC (Network Interface Card). The communication unit 14 is an example of the communication means according to the present invention. The processor 15 is, for example, a CPU (Central Processing Unit), and functions as the display control unit 15a by executing a certain program loaded from the ROM 17 or the storage device 18 into the RAM 16. Only one processor 15 may be used, or a plurality of processors may be used.

The display control unit 15a displays various screens (various windows) on the display 12 in response to an operation performed on the touch panel 11 by a user.

Figure 7:
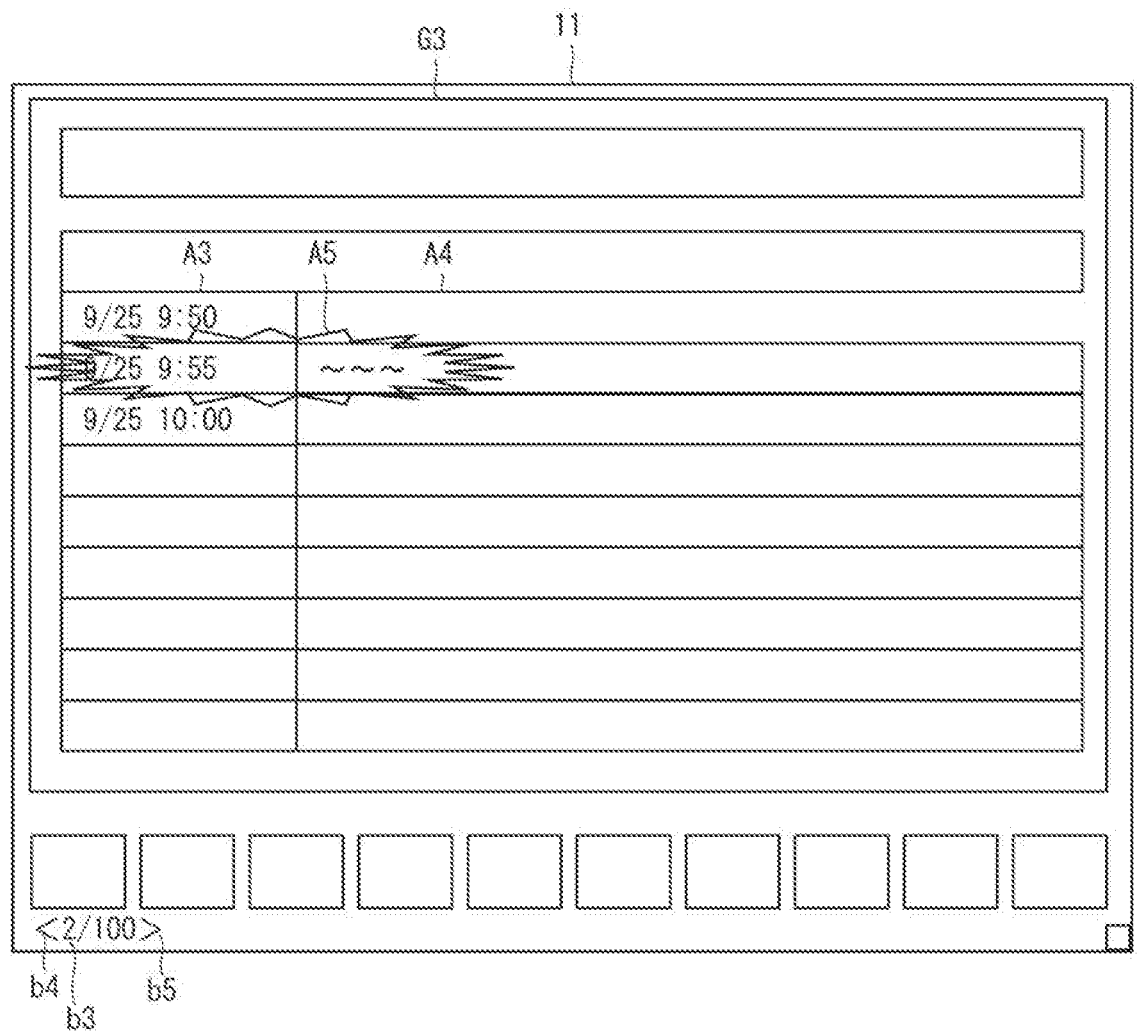
FIG. 7 shows an example of a difference information screen G3 displayed on the display 12.

Examples of the various screens displayed on the display 12 include a dynamic-state recording screen G1 (see FIG. 2), a displayed-content change screen G2 (see FIG. 5), and a difference information screen G3 (see FIG. 7).

The dynamic-state recording screen G1 has already been described in the first example embodiment, so its description is omitted.

Figure 5:
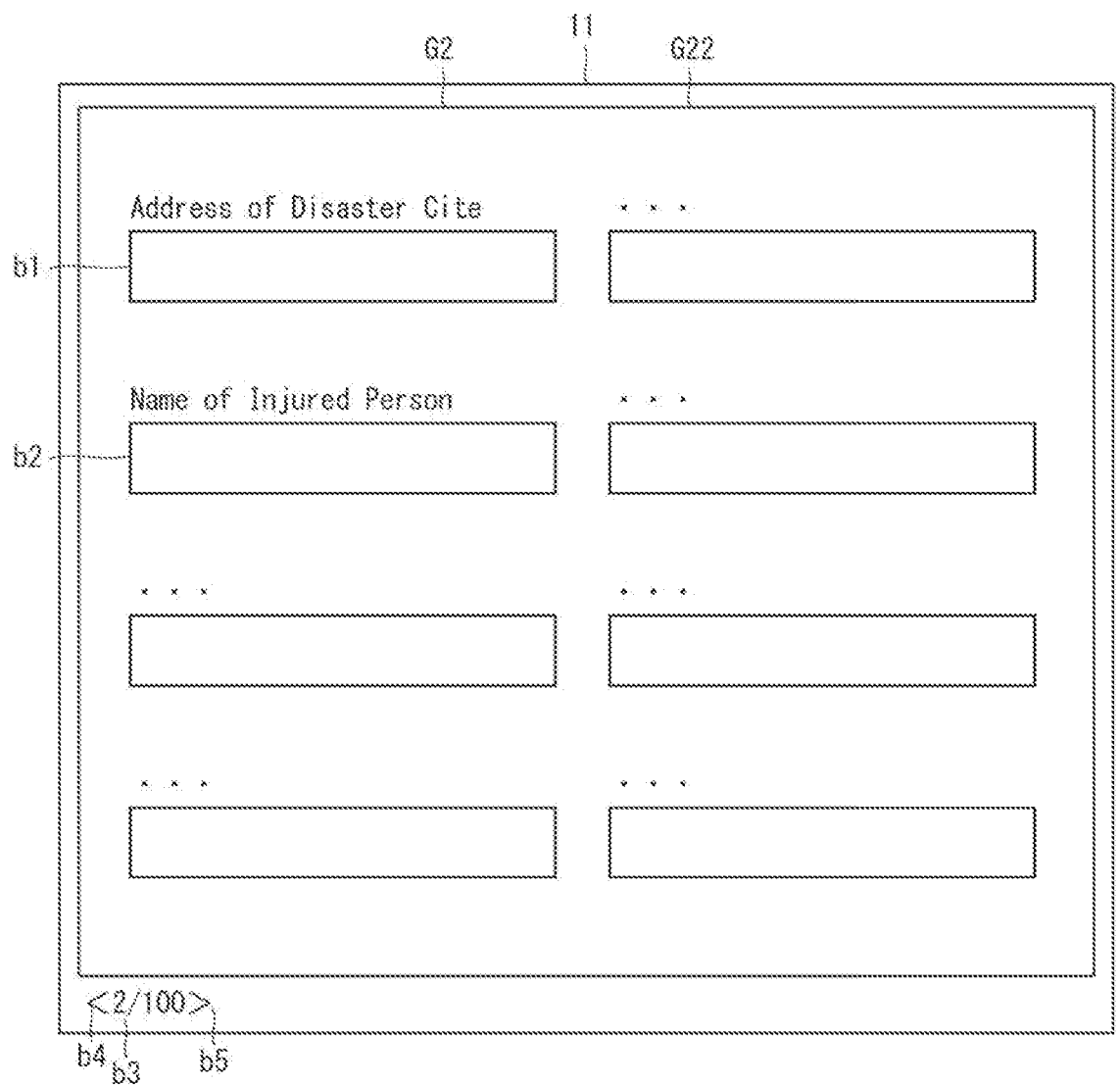
FIG. 5 shows an example of a displayed-content change screen G2 displayed on a display 12.
Figure 6:
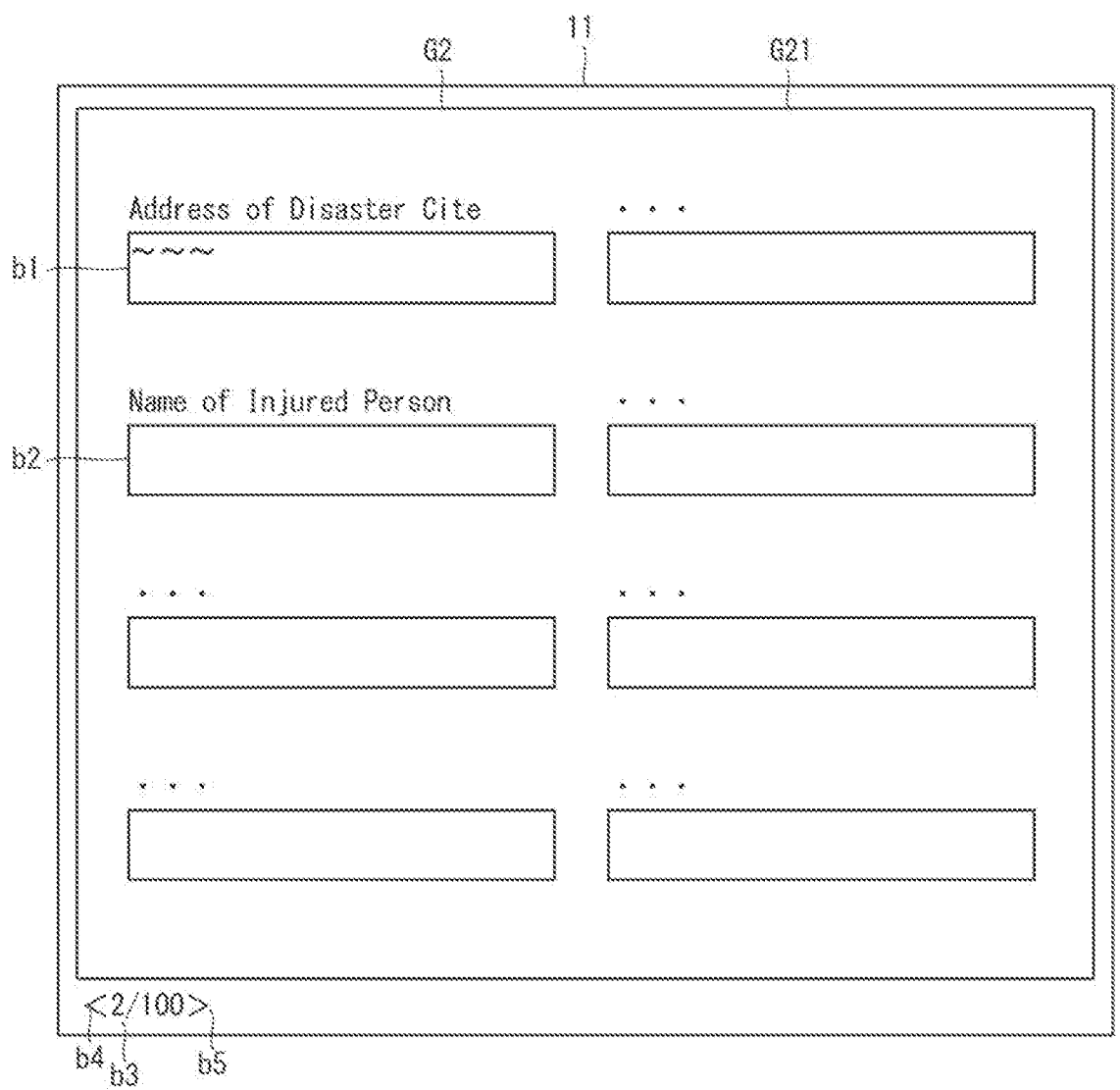
FIG. 6 shows an example of the displayed-content change screen G2 displayed on the display 12.

FIGS. 5 and 6 show examples of the displayed-content change screen G2 displayed on the display 12. The displayed-content change screen G2 is a screen (a window) in which the user can change displayed contents through the touch panel 11.

As shown in FIG. 5, the displayed-content change screen G2 includes, for example, input fields b1 and b2. In FIG. 5, a symbol b3 indicates a page number; a symbol b4 indicates a page switching button for displaying the previous page; and a symbol b5 indicates another page switching button for displaying the next page. In FIG. 6, characters "~~~" entered by the user through the touch panel 11 are entered (shown) in the input field b1.

Although not shown in the drawing, the displayed-content change screen G2 may include images (e.g., a map of a disaster site and a floor plan). In such images, a diagram or the like (e.g., an entry route) that the user inputs (draws) through the touch panel 11 is displayed in a superimposed manner.

The displayed contents of the displayed-content change screen G2 are stored in the storage device 18 (in a displayed content/difference information storage unit 18b) each time a predetermined time (e.g., 5 minutes) elapses.

FIG. 7 shows an example of the difference information screen G3 displayed on the display 12.

The difference information screen G3 is a screen (a window) in which difference information of the displayed-content change screen G2 (the displayed contents) is displayed. The difference information will be described later.

As shown in FIG. 7, the difference information screen G3 includes a date/time column A3 and a difference information display column A4.

In the date/time column A3, "save dates and times" (see FIG. 4) stored in the storage device 18 (the displayed content/difference information storage unit 18b) are displayed in the form of a list. In the difference information display column A4, "difference information" (see FIG. 4) stored in the storage device 18 (the displayed content/difference information storage unit 18b) is displayed in the form of a list. Note that when difference information "None" is stored in the storage device 18 (the displayed content/difference information storage unit 18b), nothing is displayed (or a blank space is displayed) in the difference information display column A4. Further, when difference information (e.g., "~~~") is stored in the storage device 18 (the displayed content/difference information storage unit 18b), this difference information (e.g., "~~~") is displayed in the difference information display column A4. Note that the difference information (e.g., "~~~") is highlighted. The highlighting will be described later.

The storage device 18 includes the report storage unit 18a, the displayed content/difference information storage unit 18b, and a program storage unit 18c. The displayed content/difference information storage unit 18b is an example of the second and third storage means according to the present invention. Note that, in some cases, the ROM 17 includes the program storage unit 18c.

The report storage unit 18a has already been described in the first example embodiment, so its description is omitted.

In the displayed content/difference information storage unit 18b, "displayed contents", "save dates and times", and "difference information" are stored (accumulated) in a state in which they are associated with each other (see FIG. 4). These data are stored, for example, in the form of a table or a database.

For example, each time a predetermined time (e.g., 5 minutes) elapses, the displayed contents of the displayed-content change screen G2 displayed on the display 12 at that time point are stored in the "Display Content". For example, assume that when the predetermined time (e.g., 5 minutes) has elapsed, the displayed-content change screen G2 shown in FIG. 5 is being displayed on the display 12. In this case, the displayed contents G22 (hereinafter referred to as the second displayed contents G22) of the displayed-content change screen G2 are stored (see FIG. 4). Further, assume that when the next predetermined time (e.g., 5 minutes) has elapsed, the displayed-content change screen G2 shown in FIG. 6 (in which "~~~" are entered (i.e., shown) in the input field B1) is being displayed on the display 12. In this case, the displayed contents G21 (hereinafter referred to as the first displayed contents G21) of the displayed-content change screen G2 are stored (see FIG. 4).

In the "Save Date and Time", the save dates and times of the displayed contents of the displayed-content change screen G2 stored in "Display Content" are stored. For example, when the displayed contents (the second displayed contents G22) of the displayed-content change screen G2 shown in FIG. 5 are stored in the "Display Content", the date and time (e.g., 20190925 9:50) output from the clock unit 13 at that timing is stored (see FIG. 4). Further, when the displayed contents (the first displayed contents G21) of the displayed-content change screen G1 shown in FIG. 6 are stored in the "Display Content," the date and time (e.g., 20190925 9:55) output from the clock unit 13 at that timing is stored (see FIG. 4).

In the "Difference Information", difference information (e.g., "~~~" entered (shown) in the input field b1 in FIG. 6) that is information about a difference between the displayed contents of the displayed-content change screen G2 stored in the "Display Content" (e.g., the first displayed contents G21) and the displayed contents of the displayed-content change screen G2 stored in the "Display Content" immediately before the aforementioned displayed contents (e.g., the second displayed contents G22) is stored. Note that when there is no difference between the displayed contents of the displayed-content change screen G2 stored in the "Display Content" and the displayed contents of the displayed-content change screen G2 stored in the "Display Content" immediately before the aforementioned displayed contents, "None", which indicates that there is no difference information, is stored.

In the program storage unit 18c, certain programs executed by the processor 15, for example, an OS (Operating System) and various programs executed on the OS are stored.

Next, a configuration of the headquarters apparatus 20 will be described.

The headquarters apparatus 20 is an apparatus that is installed at a place (headquarters) remote from the disaster site. The headquarters apparatus 20 is an example of the external apparatus according to the present invention. As shown in FIG. 2, the headquarters apparatus 20 includes a server 21, a communication unit 22, and a storage device 23.

The server 21 is implemented, for example, by having a computer (not shown) execute the OS and a server program executed on the OS.

The communication unit 22 is a communication apparatus that communicates with the dynamic-state recording apparatus 10B through a communication line NW (e.g., the Internet), and is, for example, a NIC (Network Interface Card).

The storage device 23 is, for example, a nonvolatile mass storage device such as HDD (Hard Disk Drive) and an SSD (Solid State Drive).

Next, as an example of operations performed by the dynamic-state recording system 1 having the above-described configuration, a dynamic-state recording process will be described.

Figure 8:
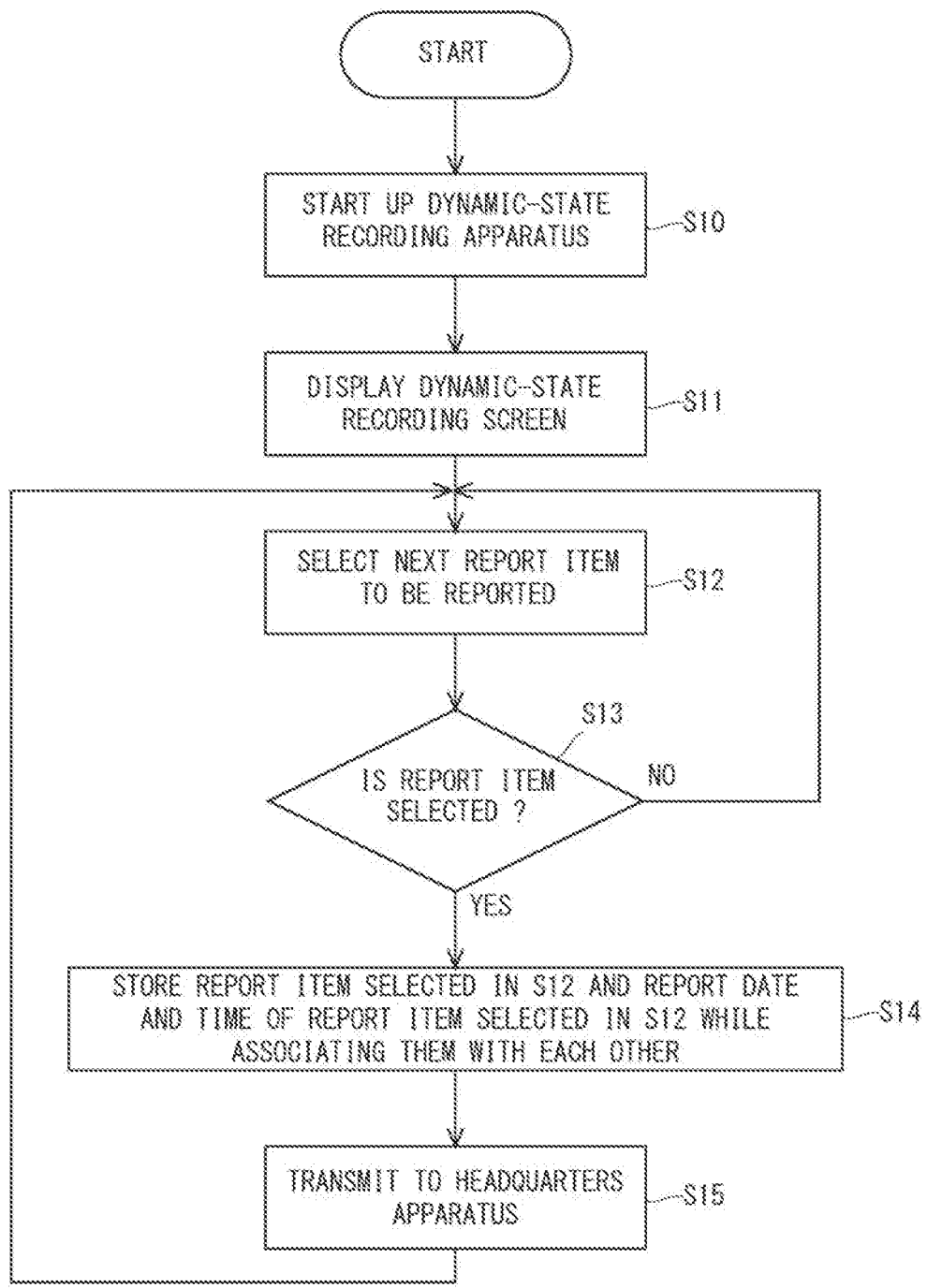
FIG. 8 is a flowchart of a dynamic-state recording process.

FIG. 8 is a flowchart of the dynamic-state recording process.

The following process is carried out by having the processor 15 execute a certain program loaded from the ROM 17 or the storage device 18 into the RAM 16.

Firstly, the dynamic-state recording apparatus 10B is started up (Step S10).

Next, the dynamic-state recording apparatus 10B (the display control unit 15a) displays the dynamic-state recording screen G1 (see FIG. 2) on the display 12 in response to an operation performed on the touch panel 11 by a user (Step S11).

Next, the user selects (taps) the next report item to be reported in the dynamic-state recording screen G1 (i.e., from among the plurality of report items) through the touch panel 11 (Step S12). In this example, it is assumed that a "Command Headquarters Setup/Change Report" is selected as the next report item to be reported (Step S13: Yes).

Next, the dynamic-state recording apparatus 10B (e.g., the processor 15) stores the report item selected in the step S12 and the report date and time of the report item selected in the step S12 in the report storage unit 18a while associating the report item and the report date and time with each other (Step S14).

Specifically, the dynamic-state recording apparatus 10B stores the report item selected in the step S12 (in this example, the "Command Headquarters Setup/Change Report") in the "Report Item" of the report storage unit 18a, and stores, as the report date and time of the report item, a date and time (e.g., 20190205 9:50) output from the clock unit 13 at the timing at which the user selected the report item in the step S12 in the "Report Date and Time" of the report storage unit 18a (see FIG. 4).

Next, the dynamic-state recording apparatus 10B (the communication unit 14) transmits the report item selected in the step S12 and the report date and time of the report item selected in the step S12 to the headquarters apparatus 20 (Step S15).

The headquarters apparatus 20 (the communication unit 22) receives the report item selected in the step S12 and the report date and time of the report item selected in the step S12, transmitted from the dynamic-state recording apparatus 10B. Then, the headquarters apparatus 20 (the server 21) stores the received report item and the received report date and time of the report item in the storage device 23 while associating the report item and the report date and time with each other. As a result, the same contents are stored in the storage device 18 of the dynamic-state recording apparatus 10B and in the storage device 23 of the headquarters apparatus 20. As a result, information can be shared one by one (in detail) between the dynamic-state recording apparatus 10B installed at the disaster site and the headquarters apparatus 20 installed at a place remote from the disaster site.

After that, whenever the user selects the next report item to be reported in the dynamic-state recording screen G1 (i.e., from among the plurality of report items) through the touch panel 11 (Step S12, Step S13: Yes), the above-described processes in the steps S14 and S15 are repeatedly performed. As a result, report items selected by the user in the step S12 and report dates and times of the report items selected in the step S12 are successively stored (accumulated) in the storage device 18 (the report storage unit 18a) of the dynamic-state recording apparatus 10B and in the storage device 23 of the headquarters apparatus 20 in a state in which the report items and the report dates and times are associated with each other.

A series of information (report item and report date/time of the report item) stored (accumulated) in a time series in this way can be used, for example, for retrospectives (A review of when and what actions were taken at the disaster site and their appropriateness) after being withdrawn from the disaster site. For example, by displaying a series of information stored in the time series on a display or printing and distributing the series of information stored in the time series, a plurality of persons can share and look back on the series of information stored in the time series. This makes it possible to improve actions at disaster sites in the future.

Next, as another example of operations performed by the dynamic-state recording system 1 having the above-described configuration, another dynamic-state recording process (according to a first modified example) will be described.

Figure 9:
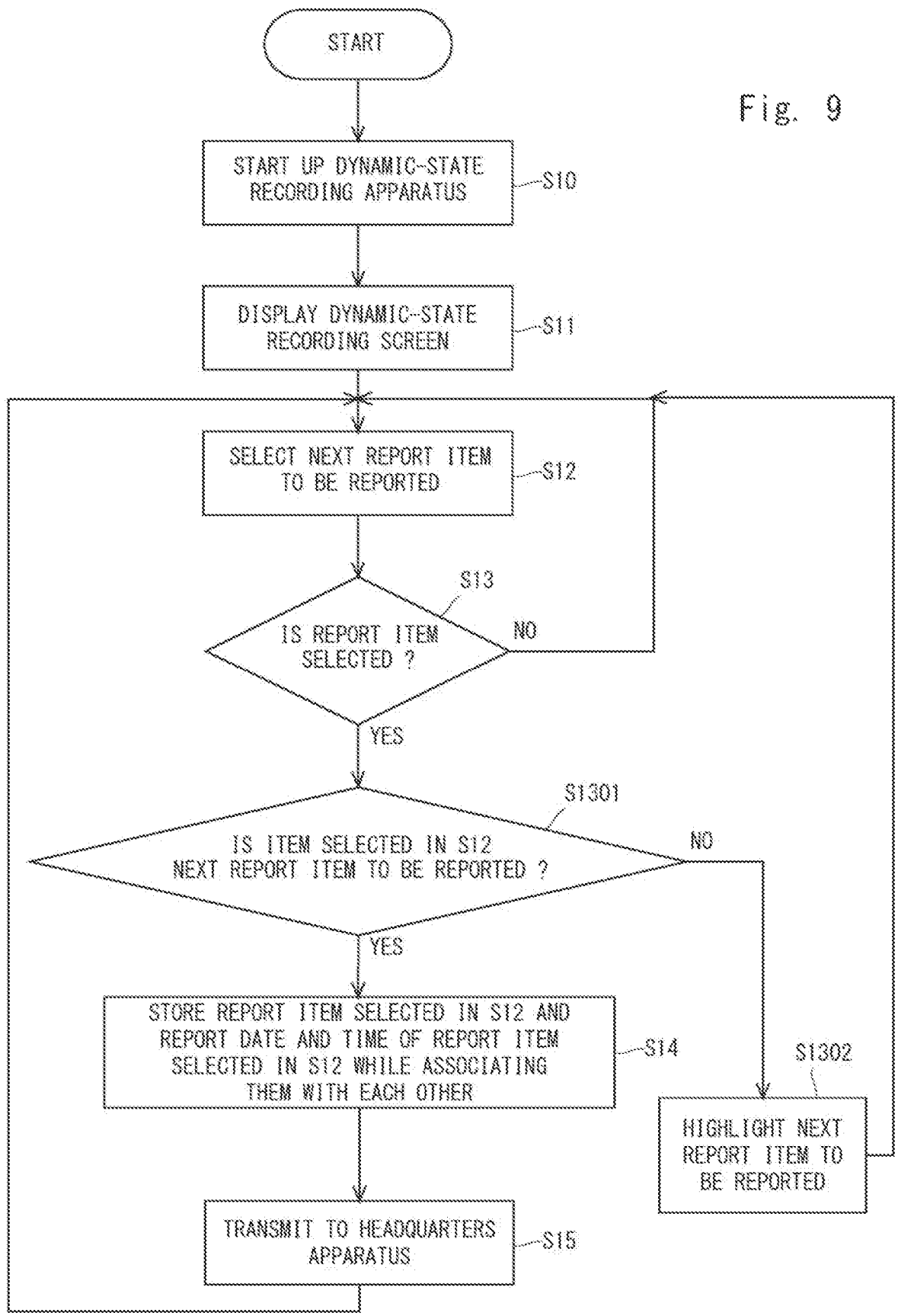
FIG. 9 is a flowchart of a dynamic-state recording process (according to a first modified example)

FIG. 9 is a flowchart of the dynamic-state recording process (according to the first modified example).

The flowchart shown in FIG. 9 corresponds to one that is obtained by adding steps S1301 and S1302 in the flowchart shown in FIG. 8. The following description will be given with particular emphasis on differences from the flowchart shown in FIG. 8.

Firstly, the dynamic-state recording apparatus 10B is started up (Step S10).

Next, the dynamic-state recording apparatus 10B (the display control unit 15a) displays the dynamic-state recording screen G1 (see FIG. 2) on the display 12 in response to an operation performed on the touch panel 11 by a user (Step S11).

Next, the user selects (taps) the next report item to be reported in the dynamic-state recording screen G1 (i.e., from among the plurality of report items) through the touch panel 11 (Step S12). In this example, it is assumed that, instead of the next report item to be reported "Command Headquarters Setup/Change Report", a "Escape Fail Report", which is displayed immediately below the "Command Headquarters Setup/Change Report", is mistakenly selected (Step S13: Yes).

Next, the dynamic-state recording apparatus 10B (e.g., the processor 15) determines whether or not the report item selected in the step S12 is the next report item to be reported (Step S1301).

In this example, since the report item "Escape Fail Report" selected in the step S12 is not the next report item to be reported "Command Headquarters Setup/Change Report" (Step S1301: No), the dynamic-state recording apparatus 10B (the display control unit 15a) determines that the report item selected in the step S12 is not the next report item to be reported (Step S1301: No), and highlights the next report item to be reported (in this example, the "Command Headquarters Setup/Change Report") in the dynamic-state recording screen G1 (i.e., among the plurality of report items) (Step S1302). In this way, it is possible to urge the user to select the next report item to be reported. For example, although not shown, a diagram surrounding the next report item to be reported is displayed as a highlight. Alternatively, a diagram (e.g., an arrow) pointing the next report item to be reported may be displayed. Alternatively, the next report item to be reported may be displayed in a blinking manner, in a black-and-white reversed manner, in a boldface, or/and in an enlarged manner. The next report item to be reported may be highlighted by using various other methods.

The rest of the processes are similar to those in FIG. 8, so their descriptions are omitted.

According to the above-described dynamic-state recording process (according to the first modified example), since the user can be urged to select the next report item by highlighting the next report item to be reported, the erroneous selection of the next report item to be reported is suppressed.

Next, as another example of operations performed by the dynamic-state recording system 1 having the above-described configuration, another dynamic-state recording process (according to a second modified example) will be described.

Figure 10:
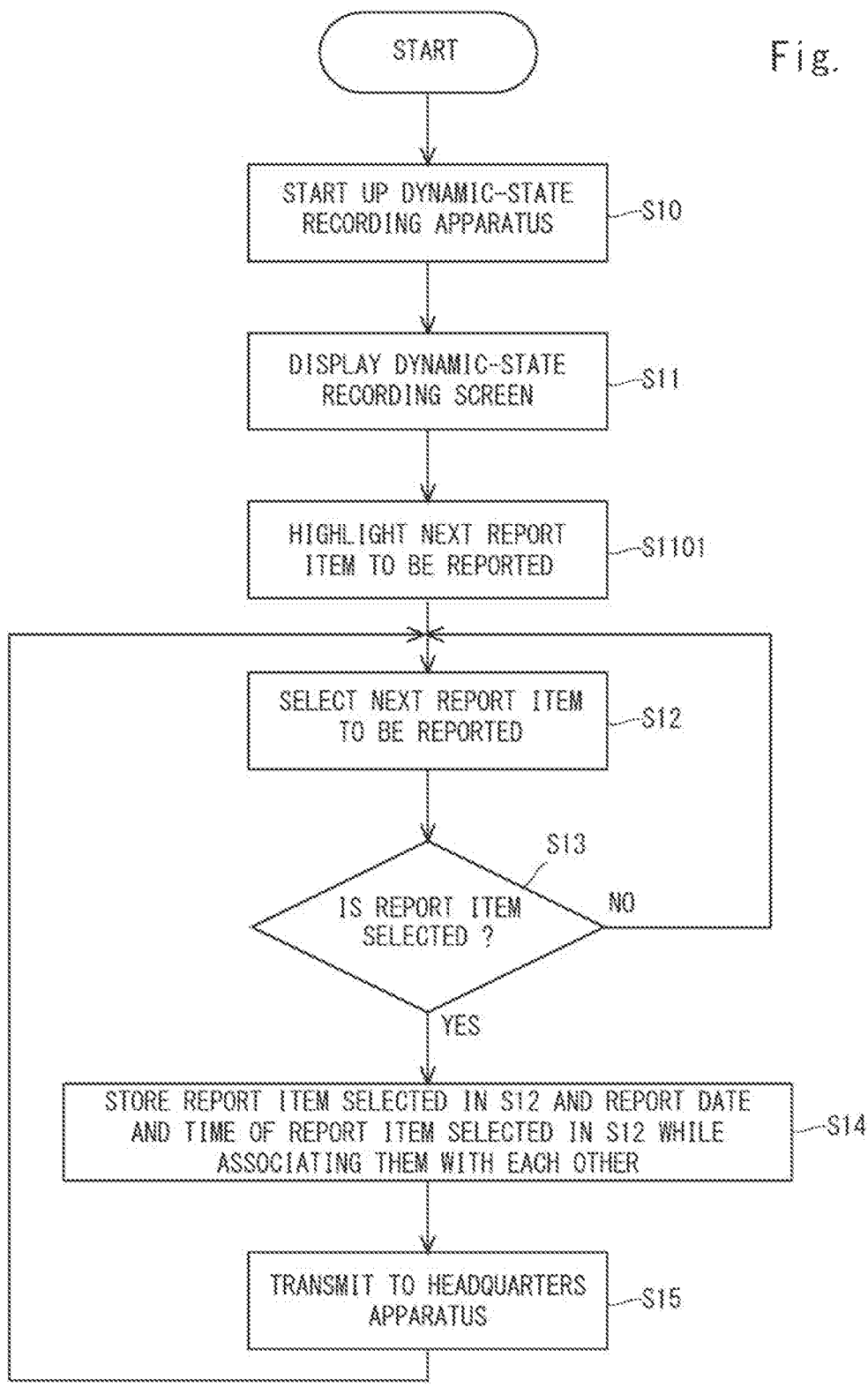
FIG. 10 is a flowchart of a dynamic-state recording process (according to a second modified example)

FIG. 10 is a flowchart of the dynamic-state recording process (according to the second modified example).

The flowchart shown in FIG. 10 corresponds to one that is obtained by adding a step S1101 in the flowchart shown in FIG. 8. The following description will be given with particular emphasis on differences from the flowchart shown in FIG. 8.

Firstly, the dynamic-state recording apparatus 10B is started up (Step S10).

Next, the dynamic-state recording apparatus 10B (the display control unit 15a) displays the dynamic-state recording screen G1 (see FIG. 2) on the display 12 in response to an operation performed on the touch panel 11 by a user (Step S11).

Next, the dynamic-state recording apparatus 10B (the display control unit 15a) highlights the next report item to be reported (e.g., the "Command Headquarters Setup/Change Report") in the dynamic-state recording screen G1 as in the case of the above-described highlighting (Step S1101). In this way, it is possible to urge the user to select the next report item to be reported.

The rest of the processes are similar to those in FIG. 8, so their descriptions are omitted.

According to the above-described dynamic-state recording process (according to the second modified example), since the user can be urged to select the next report item by highlighting the next report item to be reported, the erroneous selection of the next report item to be reported is suppressed.

Next, as another example of operations performed by the dynamic-state recording system 10 having the above-described configuration, an automatic saving process will be described.

Figure 11:
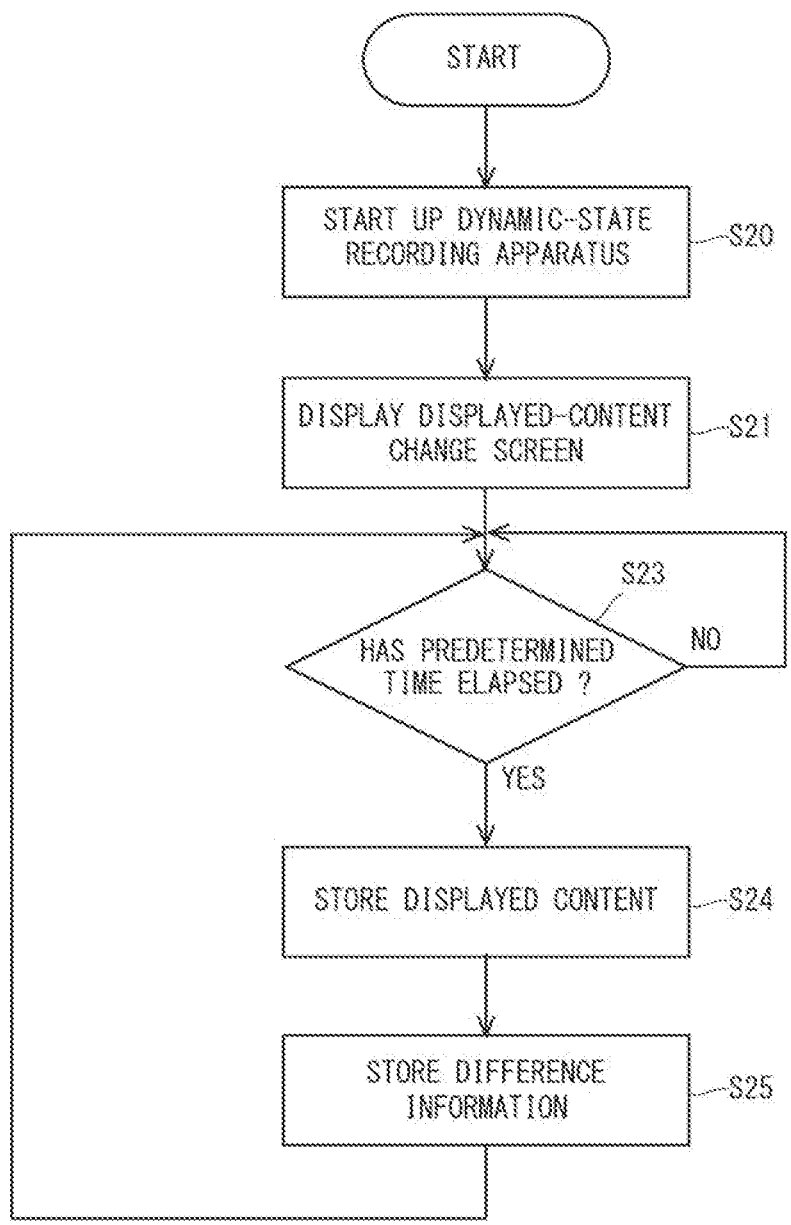
FIG. 11 is a flowchart of an automatic saving process.

FIG. 11 is a flowchart of the automatic saving process.

The following process is carried out by having the processor 15 execute a certain program loaded from the ROM 17 or the storage device 18 into the RAM 16.

Firstly, the dynamic-state recording apparatus 10B is started up (Step S20).

Next, the dynamic-state recording apparatus 10B (the display control unit 15a) displays the displayed-content change screen G2 (see, for example, FIG. 5) on the display 12 in response to an operation performed on the touch panel 11 by a user (Step S21).

Next, assume that a predetermined time (e.g., 5 minutes) has elapsed without the user changing the displayed contents of the displayed-content change screen G2 displayed on the display 12 (Step S23: Yes).

In this case, the dynamic-state recording apparatus 10B (e.g., the processor 15) stores the displayed contents of the displayed-content change screen G2 that was being displayed on the display 12 at the time at which the predetermined time (e.g., 5 minutes) has elapsed, the save date and time thereof, and the difference information in the displayed content/difference information storage unit 18b while associating them with each other (Steps S24 and S25).

Specifically, the dynamic-state recording apparatus 10B stores the displayed contents of the displayed-content change screen G2 (in this example, the second displayed contents G22 of the displayed-content change screen G2 shown in FIG. 5) that was being displayed on the display 12 at the time at which the predetermined time has elapsed in the "Display Content" of the displayed content/difference information storage unit 18b (see FIG. 4). Further, the dynamic-state recording apparatus 10B stores a date and time (e.g., 20190925 9:50), which was output from the clock unit 13 at the timing at which the displayed contents of the displayed-content change screen G2 was stored, in the "Save Date and Time" of the displayed content/difference information storage unit 18b (see FIG. 4). Further, since there is no displayed content stored in the "Display Content" immediately before the aforementioned displayed contents of the displayed-content change screen G2 stored in the "Display Content" (in this example, the second displayed contents G22 of the displayed-content change screen G2 shown in FIG. 5), the dynamic-state recording apparatus 10B stores "None" in the "Difference Information" (see FIG. 4).

Next, assume that, after the process returns to the step S22, the user has changed the displayed contents of the displayed-content change screen G2 (e.g., the user has entered characters "~~~" in the input field b1 through the touch panel 11 as shown in FIG. 6), and then the predetermined time (e.g., 5 minutes) has elapsed (Step S23: Yes).

In this case, the dynamic-state recording apparatus 10B (e.g., the processor 15) stores the displayed contents of the displayed-content change screen G2 that was being displayed on the display 12 at the time at which the predetermined time (e.g., 5 minutes) has elapsed, the save date and time thereof, and the difference information in the displayed content/difference information storage unit 18b while associating them with each other (Steps S24 and S25).

Specifically, the dynamic-state recording apparatus 10B stores the displayed contents of the displayed-content change screen G2 (in this example, the first displayed contents G21 of the displayed-content change screen G2 shown in FIG. 6) that was being displayed on the display 12 at the time at which the predetermined time has elapsed in the "Display Content" of the displayed content/difference information storage unit 18b (see FIG. 4). Further, the dynamic-state recording apparatus 10B stores a date and time (e.g., 20190925 9:55), which was output from the clock unit 13 at the timing at which the displayed contents of the displayed-content change screen G2 was stored, in the "Save Date and Time" of the displayed content/difference information storage unit 18b (see FIG. 4). Further, the dynamic-state recording apparatus 10B stores difference information (in this example, "~~~") which is information about the difference between the displayed contents of the displayed-content change screen G2 stored in the "Display Content" (in this example, the first displayed contents G21 of the displayed-content change screen G2 shown in FIG. 6) and the displayed contents of the displayed-content change screen G2 stored in the "Display Content" immediately before the aforementioned displayed contents (in this example, the second displayed contents G22 of the displayed-content change screen G2 shown in FIG. 5) (see FIG. 4).

Next, as another example of operations performed by the dynamic-state recording system 1 having the above-described configuration, a difference information displaying process will be described.

Figure 12:
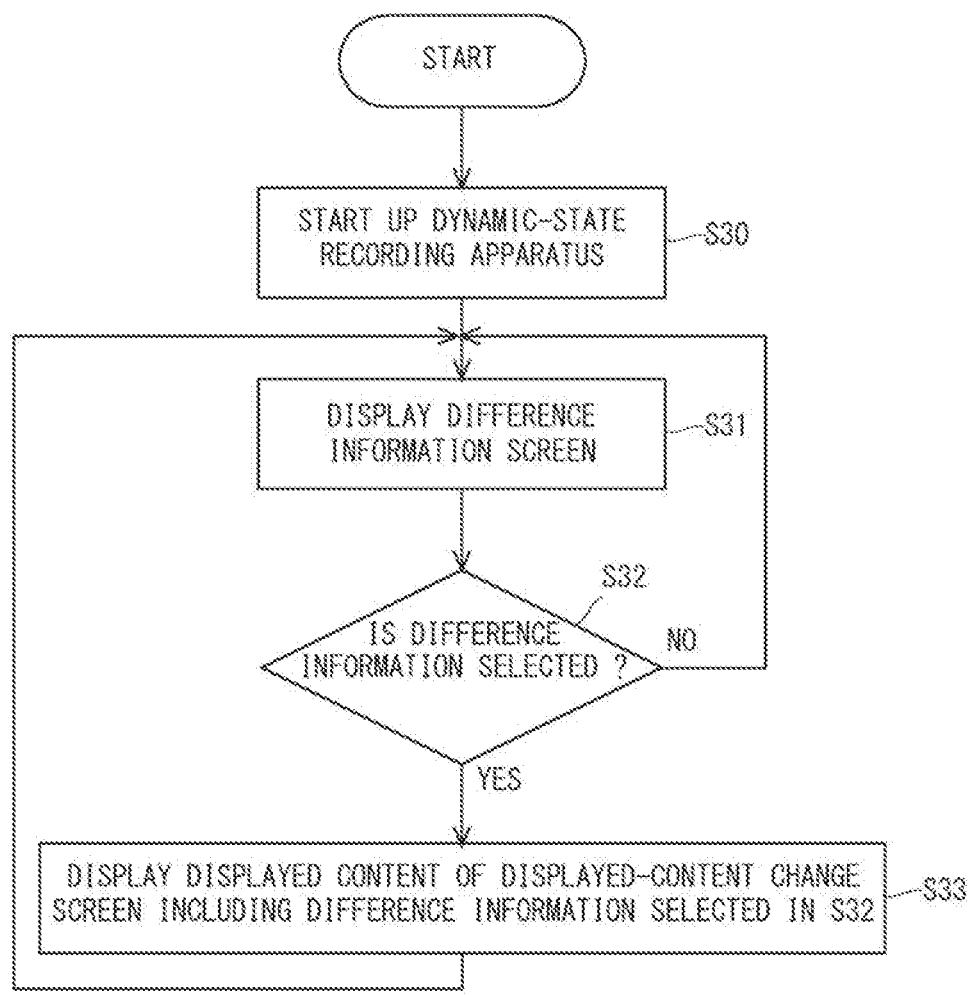
FIG. 12 is a flowchart of a difference information displaying process.

FIG. 12 is a flowchart of the difference information displaying process.

The following process is carried out by having the processor 15 execute a certain program loaded from the ROM 17 or the storage device 18 into the RAM 16.

Firstly, the dynamic-state recording apparatus 10B is started up (Step S30)

Next, the dynamic-state recording apparatus 10B (the display control unit 15a) displays the difference information screen G3 (see FIG. 7) on the display 12 in response to an operation performed on the touch panel 11 by a user (Step S31).

Specifically, the dynamic-state recording apparatus 10B (the display control unit 15a) displays the difference information screen G3 on the display 12 based on the contents stored in the displayed content/difference information storage unit 18b. When doing so, the dynamic-state recording apparatus 10B (the display control unit 15a) highlights difference information (e.g., "~~~") in the difference information screen G3. In this way, the user can recognize, at a glance, the presence/absence of the difference information. For example, a diagram surrounding the difference information (see, for example, a star-shaped diagram A5 in FIG. 7) is displayed as a highlight. Alternatively, although not shown in the drawing, a diagram (e.g., an arrow) pointing the difference information may be displayed. Alternatively, the difference information may be displayed in a blinking manner, in a black-and-white reversed manner, in a boldface, or/and in an enlarged manner. The difference information may be highlighted by using various other methods.

Next, the dynamic-state recording apparatus 10B (e.g., the processor 15) determines whether or not the difference information in the difference information screen G3 has been selected (tapped) (Step S32).

As a result of the determination, when the dynamic-state recording apparatus 10B determines that the difference information in the difference information screen G3 has been selected (Step S32: Yes), it reads out the displayed contents of the displayed-content change screen G2 including the difference information selected in the step S32 (in this example, the first displayed contents G21 of the displayed-content change screen G2 shown in FIG. 6) from the storage device 18 (the displayed content/difference information storage unit 18b), and displays (plays back) the read displayed contents on the display 12 (Step S33). When doing so, the dynamic-state recording apparatus 10B (the display control unit 15a) may highlight the difference information (in this example, "~~~") in the displayed contents of the displayed-content change screen G2 (in this example, the first displayed contents G21 of the displayed-content change screen G2 shown in FIG. 6) as in the case of the above-described highlighting. Thus, the user can grasp the location of the difference information at a glance.

Generally, at a disaster site where firefighters are engaged in activities, it is required that a plurality of reports be made in a predetermined order, and that the contents of the reports and the time of the reports be recorded (for example, record on a whiteboard) in correspondence for each report, which is a heavy burden. Therefore, it is desired to be able to record the contents of the report and the dates and times of the report in correspondence with each other by a simple operation. As described above, according to the second example embodiment (the dynamic-state recording process), each time a user selects (taps) the next report item to be reported in the dynamic-state recording screen G1 (i.e., from among the plurality of report items) through the touch panel 11, the selected report item and the report date and time of the selected report item are automatically accumulated in a state in which they are associated with each other.

That is, according to the second example embodiment (the dynamic-state recording process), it is possible to record contents of a report required at a disaster site (e.g., a disaster site where firefighters work) and a date and time of the report while associating them with each other through a simple operation.

Further, according to the second example embodiment (the difference information displaying process), the difference information in the difference information screen G3 is displayed (highlighted), so the user can recognize, at a glance, the presence/absence of the difference information in the difference information screen G3.

Further, according to the second example embodiment (the difference information displaying process), when the user selects (taps) the difference information in the difference information screen G3 via the touch panel 11, the display content of the display content change screen G2 including the selected difference information is displayed (reproduced) on the display 12. This allows for a retrospectives (a review of when and what actions were taken at the disaster site and their appropriateness) after being withdrawn from the disaster site.

Further, according to the second example embodiment (the difference information displaying process), since the difference information in the displayed contents of the displayed-content change screen G2 displayed (reproduced) as described above is highlighted, the user can grasp the position of the difference information in the display contents of the display contents change screen G2 at a glance. As a result, it is possible to efficiently carry out retrospectives after being withdrawn from the disaster site.

Further, according to the second example embodiment, since a plurality of report items are displayed in an order in which they are required to be reported, erroneous selection of the next report item to be reported is suppressed.

Further, according to the second example embodiment (the dynamic recording process (according to the first modified example)), when the report item selected (tapped) by the user through the touch panel 11 is not the next report item to be reported, the next report item to be reported among a plurality of report items is highlighted. This also suppresses erroneous selection of items to be reported next.

Further, according to the second example embodiment (the dynamic recording process (according to the second modified example)), the next report item to be reported among a plurality of report items is highlighted. This also suppresses erroneous selection of items to be reported next.

Further, according to the second example embodiment (the dynamic-state recording process), the report item selected by the dynamic-state recording apparatus 10B and the report date and time of the selected report item are correlated and transmitted to headquarters apparatus 10. As a result, information can be shared one by one (in detail) between the dynamic-state recording apparatus 10B installed at the disaster site and the headquarters apparatus 20 installed at a place remote from the disaster site.

In the above-described first and second example embodiments, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

All the numeral values mentioned in the above-described example embodiments are merely examples, and needless to say, numeral values different from them can be uses as desired.

The above-described example embodiments are merely examples in all the aspects thereof. The present invention should not be limited by the descriptions of the above-described example embodiments. The present invention may be carried out in various other forms without departing from the spirit or main features of the invention.

Further, the whole or part of the example embodiments disclosed above can be described as, but not limited to, the following supplementary notes.

(Supplementary Note 1)

A dynamic-state recording apparatus comprising:

an input device configured to be operated by a user;

a display;

display control means for displaying, on the display, a dynamic-state recording screen containing a plurality of report items required to be reported at a disaster site; and first storage means in which, each time the user selects a next report item to be reported among the plurality of report items through the input device, the selected report item and a report date and time of the selected report item are accumulated in a state in which the report item and the report date and time are associated with each other.

(Supplementary Note 2)

The dynamic-state recording apparatus described in Supplementary note 1, wherein the display control means displays, on the display, a displayed-content change screen in which the user can change a displayed content through the input device in response to an operation performed on the input device by the user, the dynamic-state recording apparatus further comprises second storage means in which, each time a predetermined time elapses, the displayed content of the displayed-content change screen displayed on the display at that time point is accumulated, and the display control means displays, on the display, a difference information screen containing difference information in response to an operation performed on the input device by the user, the difference information that is a difference between a first displayed content of the displayed-content change screen accumulated in the second storage means and a second displayed content of the displayed-content change screen accumulated in the second storage means immediately before the first displayed content.

(Supplementary Note 3)

The dynamic-state recording apparatus described in Supplementary note 2, wherein the display control means highlights the difference information in the difference information screen.

(Supplementary Note 4)

The dynamic-state recording apparatus described in Supplementary note 2 or 3, further comprising third storage means in which the difference information is accumulated.

(Supplementary Note 5)

The dynamic-state recording apparatus described in any one of Supplementary notes 1 to 4, wherein the display control means highlights a next report item to be reported among the plurality of report items.

(Supplementary Note 6)

The dynamic-state recording apparatus described in Supplementary note 5, wherein when the report item selected by the user through the input device is not the next report item to be reported, the display control means highlights the next report item to be reported among the plurality of report items.

(Supplementary Note 7)

The dynamic-state recording apparatus described in any one of Supplementary notes 2 to 4, wherein when the user selects the difference information in the difference information screen through the input device, the display control means reads out a displayed content of the displayed-content change screen containing the selected difference information from the second storage means, and displays the read displayed content on the display.

(Supplementary Note 8)

The dynamic-state recording apparatus described in Supplementary note 7, wherein the display control means highlights the difference information in the displayed content of the displayed-content change screen.

(Supplementary Note 9)

The dynamic-state recording apparatus described in any one of Supplementary notes 1 to 8, wherein the display control means displays the plurality of report items in an order according to which the report items should be reported.

(Supplementary Note 10)

The dynamic-state recording apparatus described in any one of Supplementary notes 1 to 9, further comprising communication means for transmitting the selected report item and the report date and time of the selected report item to an external apparatus while associating the report item and the report date and time with each other.

(Supplementary Note 11)

A dynamic-state recording apparatus comprising:

an input device configured to be operated by a user;

a display;

display control means for displaying, on the display, a displayed-content change screen in which the user can change a displayed content through the input device; and second storage means in which, each time a predetermined time elapses, the displayed content of the displayed-content change screen displayed on the display at that time point is accumulated, wherein the display control means displays a difference information screen containing difference information on the display in response to an operation performed on the input device by the user, the difference information that is a difference between a first displayed content of the displayed-content change screen, accumulated in the second storage means and a second displayed content of the displayed-content change screen, accumulated in the second storage means immediately before the first displayed content.

(Supplementary Note 12)

The dynamic-state recording apparatus described in Supplementary note 11, wherein the display control means highlights the difference information in the difference information screen.

(Supplementary Note 13)

A dynamic-state recording system comprising:
a dynamic-state recording apparatus installed at a disaster site; and
an external apparatus installed at a place remote from the disaster site, wherein
the dynamic-state recording apparatus comprises:
an input device configured to be operated by a user;
a display;
display control means for displaying, on the display, a dynamic-state recording screen containing a plurality of report items required to be reported at a disaster site;
first storage means in which, each time the user selects a next report item to be reported among the plurality of report items through the input device, the selected report item and a report date and time of the selected report item are accumulated in a state in which the report item and the report date and time are associated with each other; and
communication means for transmitting the selected report item and the report date and time of the selected report item to the external apparatus while associating the report item and the report date and time with each other, and
the external apparatus comprises a storage device in which the selected report item and the report date and time of the selected report item, transmitted from the communication means are accumulated in a state in which the report item and the report date and time are associated with each other.

(Supplementary Note 14)

The dynamic-state recording system described in Supplementary note 13, wherein
the display control means displays, on the display, a displayed-content change screen in which the user can change a displayed content through the input device in response to an operation performed on the input device by the user,
the dynamic-state recording system further comprises second storage means in which, each time a predetermined time elapses, the displayed content of the displayed-content change screen displayed on the display at that time point is accumulated, and
the display control means displays, on the display, a difference information screen containing difference information in response to an operation performed on the input device by the user, the difference information that is a difference between a first displayed content of the displayed-content change screen accumulated in the second storage means and a second displayed content of the displayed-content change screen accumulated in the second storage means immediately before the first displayed content.

(Supplementary Note 15)

A dynamic-state recording method comprising:
a step of displaying, on a display, a dynamic-state recording screen containing a plurality of report items required to be reported at a disaster site;
a step of making a user select a next report item to be reported from among the plurality of report items through an input device; and
a step of accumulating, each time the report item is selected, the selected report item and a report date and time of the selected report item in first storage means.

(Supplementary Note 16)

The dynamic-state recording method described in Supplementary note 15, further comprising:
a step of displaying, on the display, a displayed-content change screen in which the user can change a displayed content through the input device;
a step of accumulating, each time a predetermined time elapses, the displayed content of the displayed-content change screen displayed on the display at that time point in second storage means; and
a step of displaying a difference information screen containing difference information on the display, the difference information that is a difference between a first displayed content of the displayed-content change screen accumulated in the second storage means and a second displayed content of the displayed-content change screen accumulated in the second storage means immediately before the first displayed content.

(Supplementary Note 17)

A computer readable recording medium storing a program for causing an electronic device comprising an input device configured to be operated by a user, a display, and at least one processor to perform:
a process of displaying, on the display, a dynamic-state recording screen containing a plurality of report items required to be reported at a disaster site;
a process of making a user select a next report item to be reported from among the plurality of report items through the input device; and
a process of accumulating, each time the report item is selected, the selected report item and a report date and time of the selected report item in first storage means.

(Supplementary Note 18)

The computer readable recording medium described in Supplementary note 17, further storing a program for causing the electronic device to perform:
a process of displaying, on the display, a displayed-content change screen in which the user can change a displayed content through the input device;
a process of accumulating, each time a predetermined time elapses, the displayed content of the displayed-content change screen displayed on the display at that time point in second storage means; and
a process of displaying a difference information screen containing difference information on the display, the difference information that is a difference between a first displayed content of the displayed-content change screen accumulated in the second storage means and a second displayed content of the displayed-content change screen accumulated in the second storage means immediately before the first displayed content.

REFERENCE SIGNS LIST

1 DYNAMIC RECORDING SYSTEM
10A, 10B DYNAMIC-STATE RECORDING APPARATUS
11 TOUCH PANEL
12 DISPLAY
13 CLOCK UNIT
14 COMMUNICATION UNIT
15 PROCESSOR
15a DISPLAY CONTROL UNIT
18 STORAGE DEVICE
18a REPORT STORAGE UNIT
18b DISPLAYED CONTENT/DIFFERENCE INFORMATION STORAGE UNIT
18c PROGRAM STORAGE UNIT
20 HEADQUARTERS APPARATUS
21 SERVER
22 COMMUNICATION UNIT
23 STORAGE DEVICE
A1 REPORT ITEM DISPLAY AREA
A2 SEARCH RESULT DISPLAY AREA
A3 DATE AND TIME FIELD
A4 DIFFERENCE INFORMATION DISPLAY FIELD
G1 DYNAMIC-STATE RECORDING SCREEN
G2 DISPLAYED CONTENT CHANGE SCREEN
G3 DIFFERENCE INFORMATION SCREEN
NW COMMUNICATION LINE

What is claimed is:

1. A dynamic-state recording apparatus comprising:
a display capable of receiving user inputs through an input device;
at least one memory storing instructions; and
at least one processor configured to execute the instructions to:
display, on the display, a dynamic-state recording screen containing a plurality of report items required to be reported at a disaster site; and
store, in response to selecting a report item to be reported among the plurality of report items through the input device by the user, the selected report item and information of date and time in which the report item is selected, the selected report and the information of date and time being stored to associate with each other;
display, on the display, a displayed-content change screen in which the user can change a displayed content through the input device in response to an operation performed on the input device by the user,
store, each time a predetermined time elapses, the displayed content of the displayed-content change screen displayed on the display at that time point, and
display, on the display, a difference information screen containing difference information stored at each time point for the displayed-content change screen indicating a presence or absence of a difference information in response to an operation performed on the input device by the user, the difference information that is a difference between a first displayed content of the displayed-content change screen stored and a second displayed content of the displayed-content change screen stored immediately before the first displayed content.

2. The dynamic-state recording apparatus according to claim 1, wherein
the at least one processor is further configured to execute the instructions to
highlight the difference information in the difference information screen.

3. The dynamic-state recording apparatus according to claim 1, wherein
the at least one processor is further configured to execute the instructions to
store the difference information.

4. The dynamic-state recording apparatus according to claim 1, wherein
the at least one processor is further configured to execute the instructions to
highlight a next report item to be reported among the plurality of report items.

5. The dynamic-state recording apparatus according to claim 4, wherein
the at least one processor is further configured to execute the instructions to
highlight the next report item to be reported among the plurality of report items, when the report item selected by the user through the input device is not the next report item to be reported.

6. The dynamic-state recording apparatus according to claim 1, wherein
the at least one processor is further configured to execute the instructions to
read out a displayed content of the displayed-content change screen containing the selected difference information, and displays the read displayed content on the display, when the user selects the difference information in the difference information screen through the input device.

7. The dynamic-state recording apparatus according to claim 6, wherein
the at least one processor is further configured to execute the instructions to
highlight the difference information in the displayed content of the displayed-content change screen.

8. The dynamic-state recording apparatus according to claim 1, wherein
the at least one processor is further configured to execute the instructions to
display the plurality of report items in an order according to which the report items should be reported.

9. The dynamic-state recording apparatus according to claim 1, wherein
the at least one processor is further configured to execute the instructions to
transmit the selected report item and the information of date and time of the selected report item to an external apparatus while associating the report item and the information of date and time with each other.

10. The dynamic-state recording apparatus according to claim 1, wherein
the order of reporting of the plurality of report items is determined.

11. A dynamic-state recording system comprising:
a dynamic-state recording apparatus installed at a disaster site; and
an external apparatus installed at a place remote from the disaster site, wherein
the dynamic-state recording apparatus comprises:
a display capable of receiving user input through an input device;
at least one memory storing instructions; and
at least one processor configured to execute the instructions to:
display, on the display, a dynamic-state recording screen containing a plurality of report items required to be reported at a disaster site; and store, in response to selecting a report item to be reported among the plurality of report items through the input device by the user, the selected report item and information of date and time in which the report item is selected, the selected report item and the information of date and time being stored to associate with each other, transmit the selected report item and the information of date and time to the external apparatus while associating the selected report item and the information of date and time with each other, wherein the external apparatus comprises a storage device, the storage device being configured to store the selected report item and the information of date and time, to associate with each other, which are transmitted from the dynamic-state recording apparatus, and wherein the at least one processor configured to execute the instructions to:

display, on the display, a displayed-content change screen in which the user can change a displayed content through the input device in response to an operation performed on the input device by the user, store, each time a predetermined time elapses, the displayed content of the displayed-content change screen displayed on the display at that time point is stored, and display, on the display, a difference information screen containing difference information stored at each time point for the displayed-content change screen indicating a presence or absence of a difference information in response to an operation performed on the input device by the user, the difference information that is a difference between a first displayed content of the displayed-content change screen stored and a second displayed content of the displayed-content change screen stored immediately before the first displayed content.

12. The dynamic-state recording system according to claim 11, wherein
the order of reporting of the plurality of report items is determined.

13. A dynamic-state recording method comprising:
displaying, on a display, a dynamic-state recording screen containing a plurality of report items required to be reported at a disaster site;

receiving an instruction which indicated that selecting a report item to be reported from among the plurality of report items through an input device by a user; and storing, in response to receiving the instruction, the selected report item and information of date and time in which the report item is selected, the selected report and the information of date and time being stored to associate with each other;

displaying, on the display, a displayed-content change screen in which the user can change a displayed content through the input device;

storing, each time a predetermined time elapses, the displayed content of the displayed-content change screen displayed on the display at that time point; and displaying a difference information screen containing difference information stored at each time point for the displayed-content change screen indicating a presence or absence of a difference information in response to an operation performed on the input device by the user, the difference information that is a difference between a first displayed content of the displayed-content change screen stored and a second displayed content of the displayed-content change screen stored immediately before the first displayed content.

14. The dynamic-state recording method according to claim 13, wherein
the order of reporting of the plurality of report items is determined.

* * * * *